(12) United States Patent
Benham (10) Patent No.: US 7,493,707 B2
(45) Date of Patent: Feb. 24, 2009

(54) LOW-COST DISPOSABLE PROTECTIVE FOOT COVERING

(75) Inventor: Joan M. Benham, New York, NY (US)

(73) Assignee: Designing Sisters, Inc., New York, NY (US)

( * ) Notice: Subject to any disclaimer, the term of this patent is extended or adjusted under 35 U.S.C. 154(b) by 334 days.

(21) Appl. No.: 10/969,399

(22) Filed: Oct. 20, 2004

(65) Prior Publication Data

US 2005/0126037 A1   Jun. 16, 2005

Related U.S. Application Data

(60) Provisional application No. 60/516,669, filed on Oct. 31, 2003.

(51) Int. Cl.
*A43R 3/16* (2006.01)
*A43R 1/02* (2006.01)
(52) U.S. Cl. .................... 36/9 R; 36/7.1 R
(58) Field of Classification Search ............ 36/9 R, 36/9 A, 7.1 R
See application file for complete search history.

(56) References Cited

U.S. PATENT DOCUMENTS

| | | | | |
|---|---|---|---|---|
| 1,544,578 A | * | 7/1925 | Henderson | 36/11.5 |
| 1,686,975 A | * | 10/1928 | Lawson | 36/11.5 |
| 2,276,582 A | * | 3/1942 | Krevis | 36/9 A |
| 2,614,341 A | * | 10/1952 | Abbott | 36/11.5 |
| 2,764,823 A | * | 10/1956 | Struble et al. | 36/9 R |
| 2,943,403 A | * | 7/1960 | Meister | 36/9 A |
| 3,402,323 A | * | 9/1968 | Longstreth | 361/223 |
| 3,647,060 A | * | 3/1972 | Kiely | 206/389 |
| RE28,563 E | * | 9/1975 | Mitchell et al. | 156/252 |
| 4,145,822 A | * | 3/1979 | Mitchell et al. | 36/87 |
| 4,272,859 A | * | 6/1981 | Vanhove | 12/142 K |
| 4,571,851 A | * | 2/1986 | Yamada | 36/11.5 |
| 6,006,448 A | * | 12/1999 | Hellman | 36/11.5 |
| 6,023,856 A | * | 2/2000 | Brunson et al. | 36/7.1 R |
| 6,339,888 B1 | * | 1/2002 | Brunson et al. | 36/7.1 R |
| 6,532,686 B2 | * | 3/2003 | Gultekin et al. | 36/7.1 R |

* cited by examiner

*Primary Examiner*—Marie Patterson (57) ABSTRACT

Low-cost, single-use, disposable foot coverings and a method of using them to facilitate the protection of the feet of individuals who remove their shoes and would otherwise have to walk barefoot are disclosed. Assemblages of a number of such foot coverings (e.g., in the form of a continuous serrated roll of them) and methods of making the assemblages are also disclosed. The foot coverings may be particularly useful at security stations (e.g., in airports) where individuals must remove their shoes for inspection and then walk barefoot until their shoes are returned to them.

1 Claim, 6 Drawing Sheets

LOW-COST DISPOSABLE PROTECTIVE FOOT COVERING

Applicant claims the benefit of earlier U.S. Provisional Patent Application. Application No.: 60/516,669, Title: LOW-COST DISPOSABLE PROTECTIVE FOOT COVERING, Filing date: Oct. 31, 2003.

BACKGROUND OF THE INVENTION AND OTHER INFORMATION

This invention concerns low-cost, disposable, protective footwear that can be easily and quickly put on and removed from the foot.

People in public places are sometimes required to remove their shoes, leaving them barefoot. (As used herein, the term "barefoot" refers to feet without shoes whether or not the feet are covered by socks or stockings, and the term "shoes" refers to all types of outer footwear, e.g., leather dress shoes, moccasins, sneakers, slippers, sandals, boots, and clogs.) For example, passengers at airports are often required to remove their shoes for inspection at security checkpoints and to pass through metal detectors while still barefoot. Aside from the possible discomfort caused by being barefoot on cold floors, walking on those floors, which are often heavily trafficked, is unsanitary.

Providing temporary footwear that has been pre-checked by security personnel to the millions of passengers around the world who travel by air each day so that they could pass through security checkpoints without being barefoot would be an almost impossible task. In the United States alone, there are on average about 1.7 million airline passengers each day. Even if only a third of them were required to remove their shoes for security screening, well over a million separate pieces of temporary footwear would be required for them. Unfortunately, it is possible that eventually all passengers will be required to remove their shoes and walk barefoot through security screening.

Removable overshoes are known (see, e.g., U.S. Pat. Nos. 2,449,936, 2,924,029, 2,986,823, 3,422,550, and 6,023,856), and in at least one airport, reusable bedroom-type slippers are furnished to passengers who remove their shoes to go through security check-points; however, to date, as far as is known by the inventor, there has been no solution to the present problem and, hence, the need remains for a solution, preferably one that is simple, economical, and easily implemented.

BRIEF SUMMARY OF THE INVENTION

An invention that satisfies those needs and provides still other benefits that will be apparent to those skilled in the art has now been developed. Broadly speaking, in one aspect this invention concerns a low-cost, single-use, disposable, elongate foot covering having a length and a width and comprising (a) a thin, substantially planar, elongate bottom portion having a length, a width, and a joining section and (b) a thin, substantially planar, elongate top portion having a length, a width, and a joining section, the top portion being superposed on the bottom portion and the two portions being joined to each other at their joining sections so that a concavity is formed between the top and bottom portions for receiving the foot of a person, the top section when lying completely flat having an opening too small to permit the foot to pass through but when not lying flat permitting the foot to pass through for placing in the concavity.

In another aspect, the invention concerns a continuous roll of a plurality of the foot coverings of this invention that are connected serially to one another on the roll by temporary connection means that also facilitate their separation from one another.

In another aspect, the invention concerns a method of manufacturing the continuous roll comprising the steps: (a) providing an elongate sheet of material having a length, a width, two elongate edges, one at each side of the sheet defining the width, an elongate central section running the length of the sheet, and two elongate edge sections running the length of the sheet, each one of the two elongate edge sections including a different one of the two edges; (b) folding the two elongate edges sections onto the elongate central section of the sheet to bring the two edges near each other; and (c) joining the two elongate edge sections to the elongate central section to form the roll of the plurality of the foot coverings.

In another aspect, this invention concerns a method of manufacturing a continuous roll of a plurality of the foot coverings comprising the steps: (a) providing an elongate tube of material having a width when the tube is lying flat and also having a length and (b) flattening the tube and forming parallel joinder lines that go across the width of the tube to form the roll of the plurality of the foot coverings.

In another aspect, the invention concerns a stack of a plurality of the foot coverings of this invention that are arranged for easy removal of one or more of the foot coverings at the top of the stack from the rest of the stack.

In another aspect, the invention concerns a method for facilitating the protection of the feet of individuals who remove their shoes and would otherwise have to walk barefoot, the method comprising providing to those individuals the foot coverings of this invention and allowing those individuals to temporarily wear those foot coverings.

In another aspect, the invention concerns a method for facilitating the protection of the feet of individuals who remove their shoes in connection with security screening at airports and would otherwise have to walk barefoot, the method comprising providing to those individuals the foot coverings of this invention and allowing those individuals to temporarily wear those foot coverings during security screening.

In another aspect, the invention concerns a method for facilitating security screening at airports by providing to the airports the foot coverings of this invention for use by individuals who are going to go through security screening.

The foot covering of this invention is preferably transparent (e.g., when used at airports to facilitate security screening) and of thin plastic film (e.g., for cost and manufacturing reasons). The foot covering is preferably made of a single (continuous) generally rectangular piece of thin plastic film having two oppositely disposed long sides and two oppositely disposed shorter sides. The piece of plastic film may be thought of as being divided into three sections, a main section and two wing sections of different lengths. The two wings sections are folded over onto the main section, and the main section becomes the bottom of the foot covering and the two wing sections become the top of the foot covering. The outer edges of the wing sections (which are the edges of the two shorter sides of the piece of plastic film) are brought close enough to form an opening through which the foot of a user may be inserted into the concavity that is formed inside when the two wing sections are joined to the main section along their longer edges (e.g., using tape, adhesive, tacking, or hot melt sealing). The front (toe) portion of the foot (i.e., the portion in front of the ankle) is inserted into the portion of the concavity formed by the main section and longer wing section. The rear (heel) portion of the foot is inserted into the portion of the concavity formed by the main section and shorter wing section. At least a part of the top of the foot covering is sufficiently deformable so that the opening, which is too small to permit a foot to pass through it and be placed inside the concavity when the top is lying flat, can be deformed enough to enlarge the opening sufficiently to allow the foot to pass through and be placed inside the concavity.

Making the foot covering from a continuous piece of material (e.g., as just described) or from an elongate tube (as described below) facilitates manufacturing a continuous roll of such foot coverings. Preferably the foot coverings on such a roll are joined by means (e.g., serrations) that facilitate easy separation of the foot coverings on the roll from one another, analogous to the way individual sheets on a roll of paper toweling for the kitchen are serially joined and can be torn from the roll.

The foot coverings are inexpensive to manufacture, can be easily distributed to potential users (e.g., by placing rolls of the foot coverings at security stations in airports, where the foot coverings needed can be easily torn from the rolls by passengers and/or security personnel), can be made of thin plastic film (preferably made from recycled material) and preferably can be recycled after use, can be transparent (which facilitates security screening of the feet themselves), protect the feet against dirt and pathogens, and can be easily and rapidly put on and removed from the feet. Other features and advantages will be apparent to those skilled in the art.

BRIEF DESCRIPTION OF THE DRAWINGS

To facilitate further discussion of the invention, the following drawings are provided in which.

These drawings are for illustrative purposes only and should not be used to unduly limit the scope of the present invention.

DETAILED DESCRIPTION OF THE INVENTION

The foot covering of this invention can be made of any material that allows some or all of the advantages of this invention to be achieved. Thin plastic film (e.g., not more than just a few mils in thickness and perhaps only a mil in thickness) is preferred (a "mil" is a thousandth of an inch). When used in a security setting, clear (transparent) plastic is preferred although translucent or opaque materials may be used in some cases.

The material should be flexible enough so that at least a part of the top portion of the foot covering near the opening can be deformed to the extent necessary to easily and rapidly place the foot inside the foot covering as well as to easily and rapidly remove the foot covering from the foot. The material should also be resilient enough so that the foot covering can return at least partially to its original shape after the foot has been placed inside of it so that it captures (traps) the foot to the extent necessary to keep the foot covering on the foot while in use (e.g., while standing or walking). The material should also be strong enough so that it can be deformed, return to its original shape, and provide sufficient protection to the foot while in use. Puncture resistance and impermeability (to liquids, dirt, etc.) are also desirable. The material preferably is also recyclable.

Typical materials of construction are polyolefin films (e.g., polyethylene film). Woven and non-woven materials may also be used. Different materials may be used for different parts of the foot covering although a single material for the entire foot covering will usually be preferred. The material should provide sufficient traction on the floors where the foot covering will be used, for example, on the smooth floors often found near security checkpoints at airports. Materials that are too smooth and slippery (e.g., some plastic films) may be treated at least on the major face that will become the outside of the bottom of the foot covering to impart sufficient traction. Any suitable treatment may be used (e.g., roughening the surface, placing microscopic amounts of slightly tacky polymer on the surface, for example, by spraying).

Figure 1:
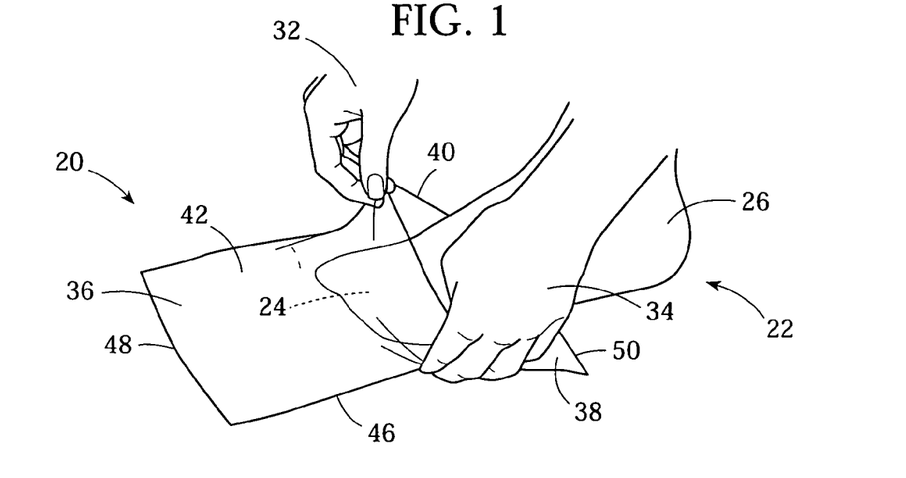
FIG. 1 shows a foot covering of this invention being placed on a foot.

In FIG. 1, foot covering 20 is being placed on left foot 22. Right hand 32 and left hand 34 are spreading the sides of opening 40 apart so that front (toe) portion 24 of foot 22 can be placed in front (toe) portion 36 of the foot covering and rear (heel) portion 26 of foot 22 can be placed in rear (heel) portion 38 of the foot covering.

Figure 2:
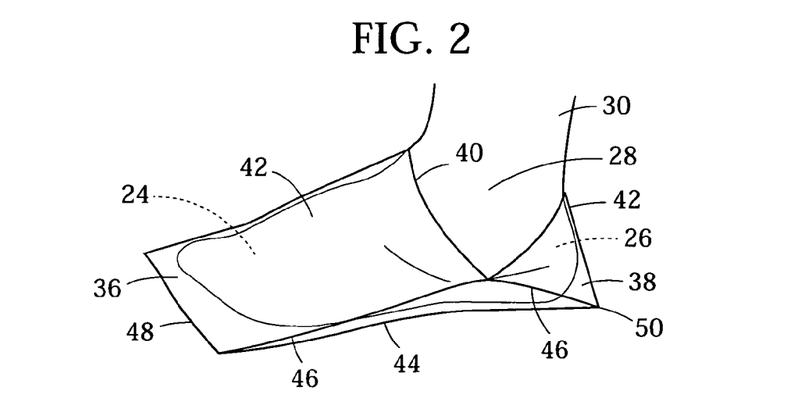
FIG. 2 is a perspective view of the foot covering on the foot.
Figure 3:
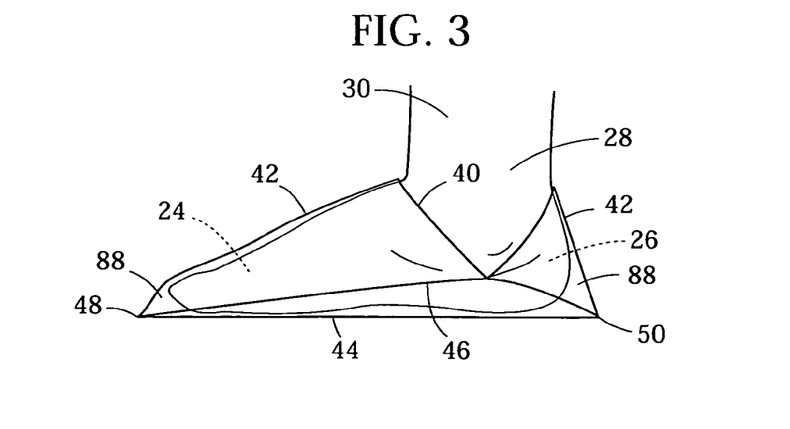
FIG. 3 is an elevational view of the foot covering on the foot.

As show in FIGS. 2 and 3, the resilience of the material causes it to try to return to its original shape (i.e., the shape without the foot inside) so that the two sides or edges defining opening 40 press against the front and rear of leg 30 at about the height of ankle 28, thereby keeping the foot covering on the foot while in use. Bottom portion 44 of the foot covering is proximate the sole of the foot and top portion 42 (which is in two parts, the front (toe) and rear (heel) sections) is proximate the top of the foot. Bottom portion 44 is joined to top portion 42 around their respective peripheries by joinders 46, 48, and 50.

Figure 4:
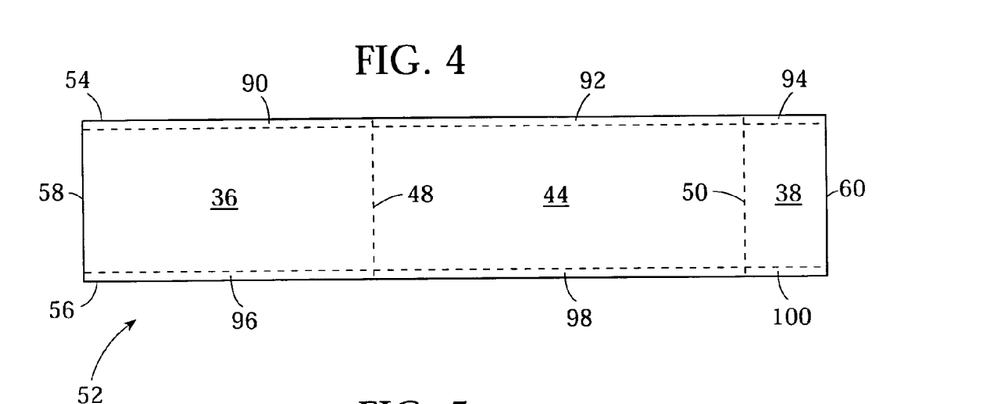
FIG. 4 is a plan view of a single piece from which the foot covering of this invention can be formed.

With reference to FIG. 4, rectangular piece 52, from which foot covering 20 may be formed, has two oppositely disposed long sides 54 and 56 and two oppositely disposed short sides 58 and 60 and may be thought of as comprising three panels (or sections) of different sizes. Leftmost panel (wing section) 36 lies between or is defined or bounded by short side (edge) 58 and fold line 48, central panel 44 lies between or is defined or bounded by fold lines 48 and 50, and rightmost panel (wing section) 38 lies between or is defined or bounded by fold line 50 and short side (edge) 60. Stated differently, leftmost panel 36 is between short side (edge) 58 and central panel 44, and rightmost panel 38 is between central panel 44 and short side (edge) 60. Fold lines 48 and 50 may be imaginary or may be actual scores, depressions, etc. in piece 52, depending on the material and method used to manufacture the foot covering from single piece 52. Joining sections 90, 92, 94, 96, 98, and 100, which in this embodiment are at the edge portions of the three panels, are used to attach wing sections 36 and 38 to central panel 44 to form concavity 88 of the foot covering (FIG. 3).

For foot coverings made from two or more separate pieces (and not from one piece, as in FIG. 4), joinders 48 and 50 may be the same as one or more of the other types of joinders used to connect the pieces together. In other words, adhesive may be used along the long sides of the pieces to connect them together, tape may be used along the front edges of front panel 36 and central panel 44 to connect them together, and a hot melt seam may be used along the rear edges of rear panel 38 and central panel 44 to connect them together. Preferably, however, foot covering 20 is made from one continuous piece of material and the front and rear joinders are continuous portions of the material (e.g., as at imaginary fold lines 48 and 50).

The size, shape, and location of all of the joining sections may be any size, shape, and location that allow the benefits of this invention to be achieved. Thus, the joining sections need not be straight and need not extend to the edge of each panel. In other words, one or more of the joining sections may be displaced from the one or more proximate edges of the piece or pieces used to make the foot covering and the resulting one or more joinders will be displaced from the edges of the foot covering.

The joinders may be hot melt, adhesive, solvent, tape, tacking, rivets, or any other type of connector that allow the benefits of this invention to be achieved. The joinders may be continuous or discontinuous. For example, a continuous joinder line of adhesive need not be used and just a few spots of adhesive may be used. Preferably, however, a continuous joinder line will be used.

Figure 5:
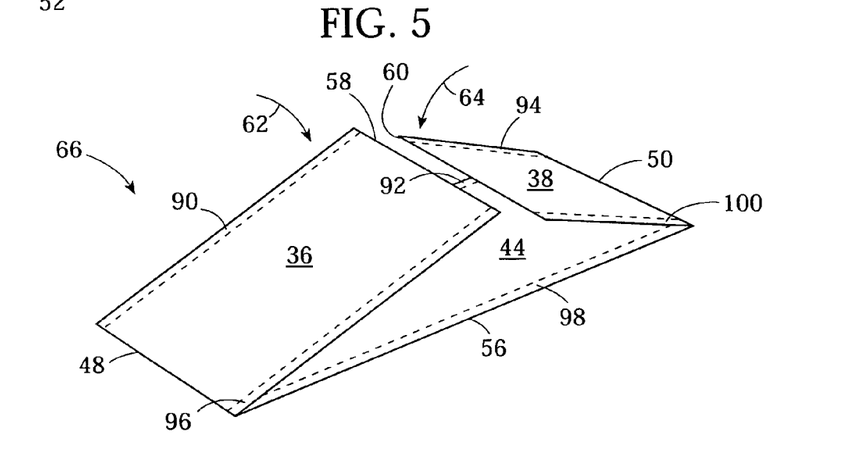
FIG. 5 shows the single piece being folded over to form a foot covering of this invention.

In FIG. 5, arrows 62 and 64 indicate panels 36 and 38 being folded up and over at fold lines 48 and 50, so that edges 58 and 60 come towards one another, to form partially folded piece 66. When this folding has been completed (so that panels 36 and 38 are superposed on panel 44), joining sections 90 and 94 will lie on top of joining section 92 and joining sections 96 and 100 will lie on top of joining section 98.

Figure 6:
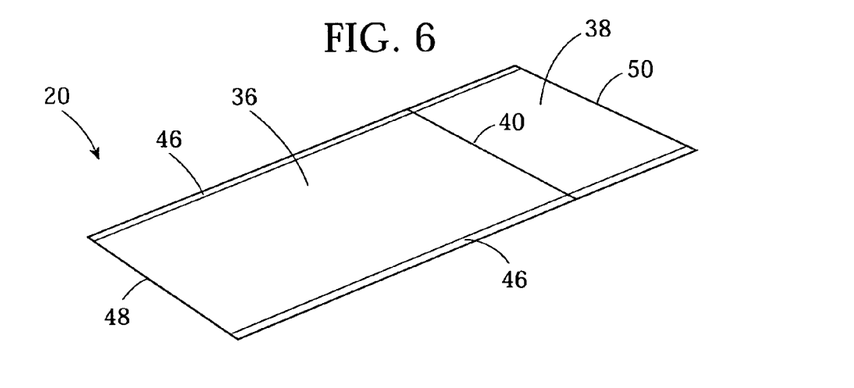
FIG. 6 shows the single piece after the folding has been completed and the long sides of the piece have been sealed to form the foot covering.

In FIG. 6, the folding of panels 36 and 38 onto panel 44 has been completed and two joinders 46 have been formed along the two long sides (indicated by reference numerals 54 and 56 in FIG. 4), thereby forming completed foot covering 20. With reference also to FIGS. 4 and 5, joining sections 90 and 94 have been connected to joining section 92 to form one joinder 46 (preferably a hot melt seam), joining sections 96 and 100 have been connected to joining section 98 to form the other joinder 46 (preferably a hot melt seam), and the material at imaginary fold lines 48 and 50 constitutes joinders 48 and 50. Joinders 46, 48, and 50 keep front (toe) portion 36 and rear (heel) portion 38 of the foot covering attached to bottom portion 44, thereby forming concavity 88 into which the foot is placed (FIG. 3). Panels 36 and 38 have become and together comprise two-part top portion 42 of the foot covering (see FIGS. 2 and 3), and panel 44 has become bottom portion 44 of the foot covering (see FIGS. 2 and 3). Edges 58 and 60 have become the two long sides defining opening 40 and the material of construction is sufficiently deformable so that edges 58 and 60 can be moved apart sufficiently to allow a foot to be placed inside the foot covering (see FIGS. 1 to 3).

Figure 7:
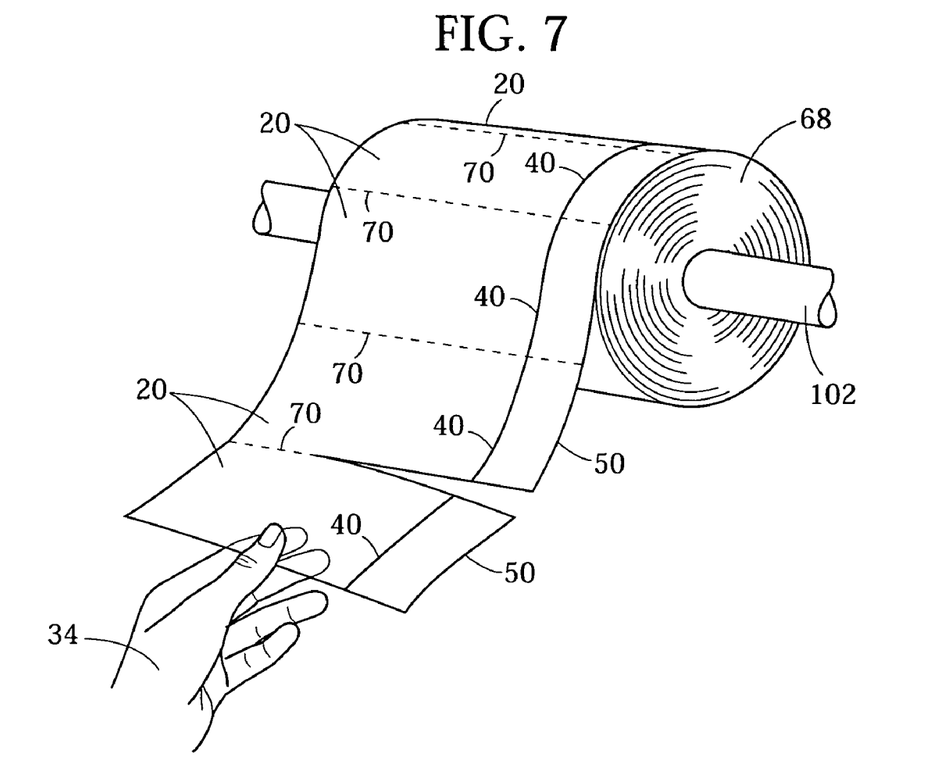
FIG. 7 shows a foot covering being torn away from a continuous roll of the foot coverings.
Figure 8:
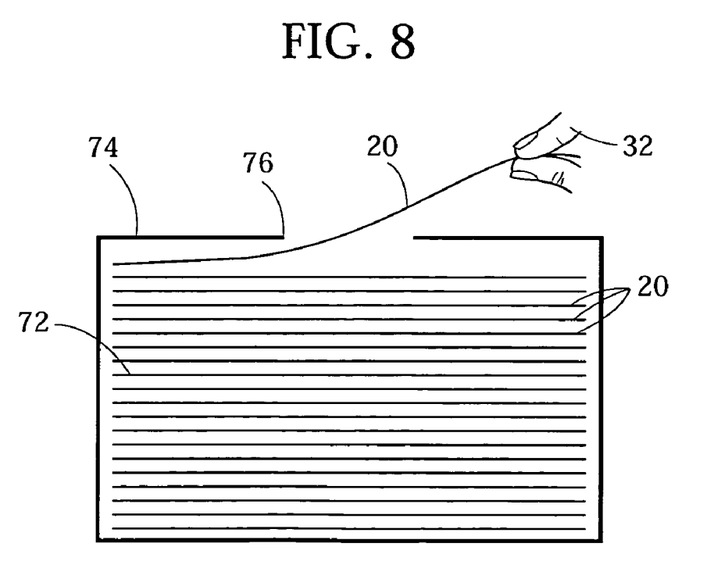
FIG. 8 shows a foot covering being removed from the top of a stack of foot coverings of this invention that is held in a container.

FIGS. 7 and 8 depict two different assemblages of the foot coverings of this invention. In FIG. 7, hand 34 is tearing one foot covering 20 from continuous roll 68 of identical foot coverings, which roll is mounted and free to rotate on shaft 102, the tearing occurring along and being facilitated by serrations 70 between the foot coverings. In FIG. 8, hand 32 is removing topmost foot covering 20 from stack 72 of identical foot coverings through opening 76 in container 74.

Figure 9:
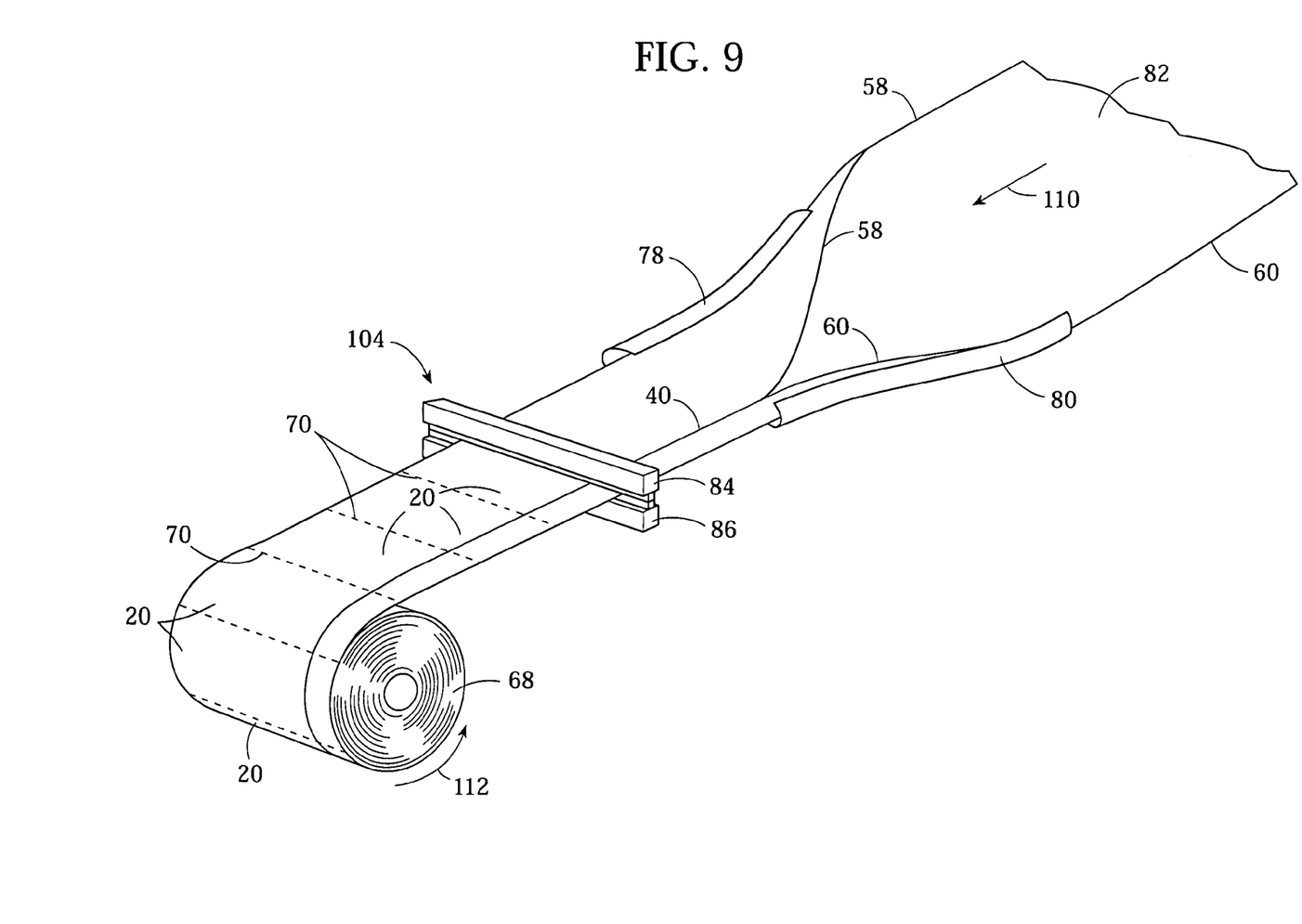
FIG. 9 schematically illustrates a method that may be used to convert a roll of film into a roll of foot coverings.

FIG. 9 schematically illustrates a preferred method for making continuous roll 68 of foot coverings 20. Continuous sheet of film 82 travels in the direction indicated by arrow 110 and is fed between curved flight bars 78 and 80, which are separated by a space narrower than the width of film 82 when it is lying flat. The geometry of the apparatus (e.g., the shape, size, location, and separation of the flight bars) helps cause wing panels 36 and 38 (see FIG. 4) to be folded over and brought together above main panel 44 (see FIG. 5), thereby bringing edges 58 and 60 together to form opening 40.

The folded film passes between bars 84 and 86 of apparatus 104, which inserts a line of serrations 70 and also heats the folded film (top and bottom) along two narrow lines parallel to, close to, and on each side of the line of serrations sufficient to cause formation of two heat seal lines. Thus, one of the elongate heat seals is at the trailing long side of the foot covering on the downstream or exit side of apparatus 104 (i.e., the left side of apparatus 104 in FIG. 9) and the other elongate heat seal is at the leading long side of the foot covering on the upstream or feed side of apparatus 104 (i.e., the right side of apparatus 104 in FIG. 9). The completed foot coverings, connected by serrations 70, are taken up on roll 68 as the roll rotates in the direction indicated by arrow 112. Instead of producing a connected series of foot coverings, the foot coverings may be cut apart from one another by or after leaving apparatus 104 (even after they have been temporarily stored as a roll) to produce individual unconnected foot coverings, e.g. for stacking in a container (see, e.g., FIG. 8).

Any temporary connection means that connects the foot coverings to one another serially (e.g., so that the connected series can be wound up on a roll) and that facilitates their separation from one another can be used. For example, continuous or discontinuous score lines, depressions, through-holes, any other suitable means or a mixture of such means can be used, but serrations (a series of discontinuous elongate cuts or holes through the connected foot coverings, which cuts or holes lie along a line, desirably a straight line) are preferred.

In another method of forming a connected series of the foot coverings of this invention, a tube of blown film is formed and then run through apparatus 104 or the like. Use of the tube eliminates the need to fold the wing sections (panels 36 and 38 in FIGS. 4 to 6) onto the central section (panel 44), which is required when using a sheet (piece 52 of FIG. 4), because the two edges 58 and 60 are already continuously joined to one another. Dies, anvils, lasers, or any other suitable means can be used to form any desired opening 40 in the tube prior to (or in some cases after) forming joinders 46 across the width of the tube and adding the temporary connection means (e.g., serrations 70) using apparatus 104 or the like. After forming the series of foot coverings (by forming joinders 46), the foot coverings may be separated from one another, e.g., for stacking.

The tube fed to apparatus 104 may be elongate (from which many foot coverings may be made) or may be the size of just a single foot covering, just as a flat sheet of film fed to apparatus 104 may be continuous (as in FIG. 9) or may be of a size for just a single foot covering; however, when using a tube or a flat sheet of film, an elongate tube or elongate sheet will generally be preferred so that a series of connected foot coverings are produced by apparatus 104.

Regardless of whether made from a single piece (e.g., a sheet or a tube) or from a plurality of pieces, the foot covering itself will have superposed top and bottom portions joined to each other.

Figure 10:
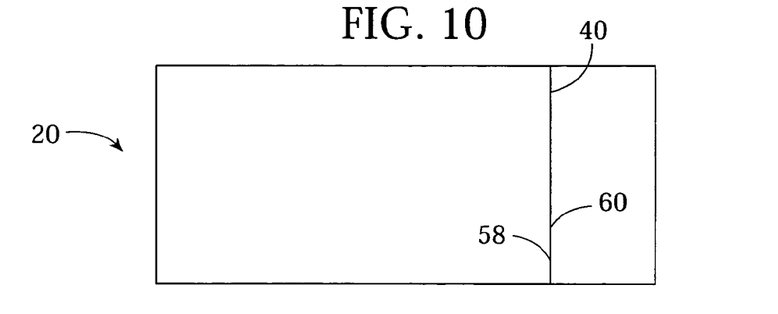
FIGS. 10 to 17 are plan views of different foot coverings of this invention.

FIG. 10 is a simplified plan view of preferred foot covering 20, whose manufacture is illustrated in FIG. 9, and does not show the two elongate heat seals along the two long sides or the serrations. Edges 58 and 60 (also see FIG. 4) define elongate opening 40.

Figure 11:
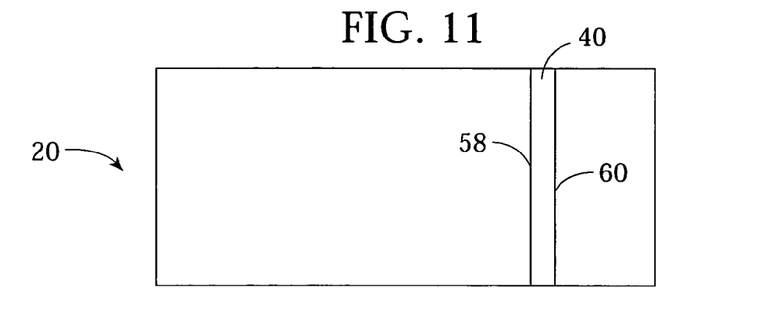

Opening 40 of foot covering 20 of FIG. 11 is wider than opening 40 in FIG. 10 because edges 58 and 60 were not brought as close together before top portion 42 (which comprises wing panels 36 and 38) was heat sealed (joined) to bottom portion 44 (see FIGS. 1 to 6).

Figure 12:
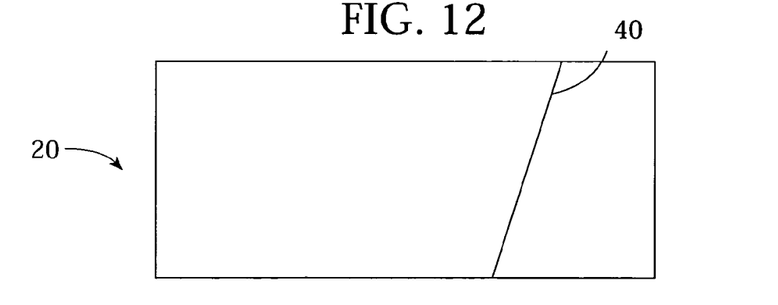
Figure 13:
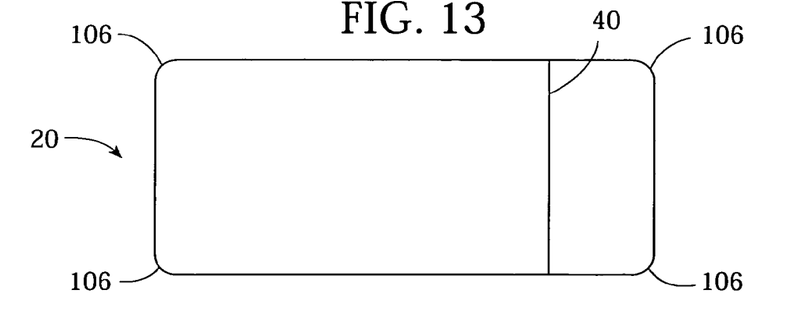
Figure 14:
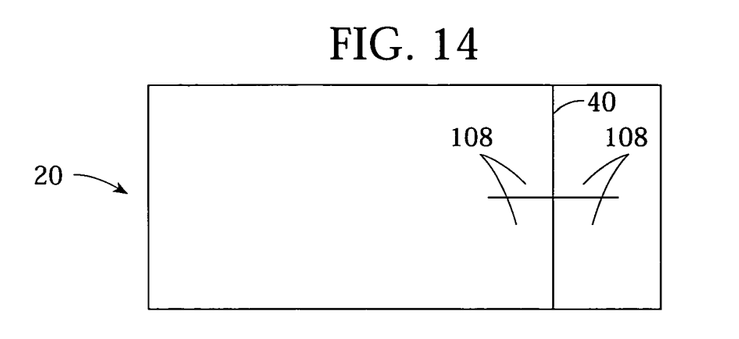
Figure 15:
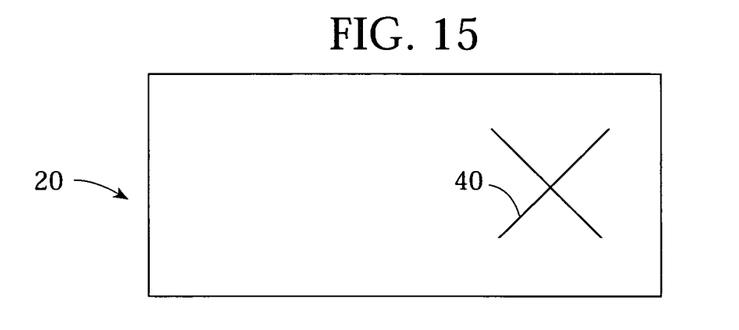
Figure 16:
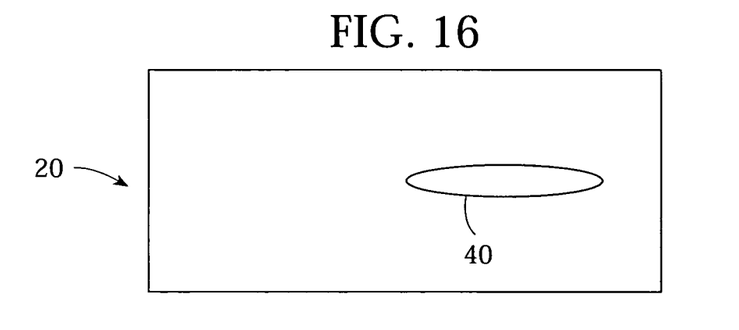
Figure 17:
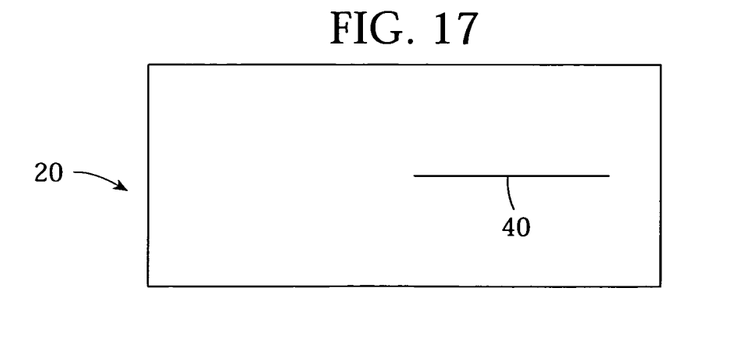

In FIG. 12, opening 40 is diagonally disposed, which may facilitate use of this foot covering on the right foot (for the left foot, opening 40 would be diagonally disposed in the opposite direction). In FIG. 13, the foot covering has rounded corners 106. In FIG. 14, opening 40 is similar to that of FIG. 10 except that a short cut perpendicular to the longer part of the opening has been added, so that opening 40 now has four flaps 108. The opening of FIG. 15 is X-shaped, the opening of FIG. 16 is oval, and the opening of FIG. 17 lies in the same direction as the length of the foot covering rather than perpendicular to the length (as in FIG. 10). These openings 40 can be formed whether starting with a tube or with a sheet of film.

Opening 40 can have any shape, size, and location that allow the benefits of this invention to be achieved; however, an elongate opening whose length is perpendicular to the length of the foot covering (as in FIGS. 10, 11, and 13) is preferred.

It is also preferred that the opening not be too close to the rear edge of the foot covering (because the rear portion of the opening is desirably at or near the ankle). Thus, the opening should be not at the rear edge and usually will be at least 1 millimeter, desirably at least 2 millimeters, more desirably at least 3 millimeters, most desirably at least 4 millimeters, preferably at least 5 millimeters, more preferably at least 6 millimeters, and most preferably at least 7 millimeters from the rear edge. In a foot covering suitable for an adult, the opening will usually be at least 25 millimeters from the rear edge. For example, with reference to FIG. 6, opening 40 is at least 7 millimeters from the rear edge of the foot covering, which rear edge in FIG. 6 is joinder 50. With reference to FIGS. 10 to 17, no portion of opening 40 in any of the foot coverings will be closer than 1 millimeter to the respective rear edge (the rear edge being the edge of each foot covering at the right side of each figure), and those openings will typically be at least 7 millimeters or more from the rear edge.

When the top portion of the foot covering is lying flat, the opening will typically be too small for a foot to pass through. Thus, the opening must be deformable enough so that a foot can be placed through the opening while it is being deformed and into the concavity. The opening must also be resilient enough so that it tries to return to its original size and shape after the foot has been placed inside the foot covering to thereby trap the bottom of the leg to prevent the foot covering from falling off the foot while in use. The opening preferably fits snugly around the bottom portion of the leg to keep foreign objects (e.g., liquids, dirt) from entering the foot covering.

The foot covering can have any size and shape that allow the benefits of this invention to be achieved. In most cases, a roughly rectangular shape will be preferred (with or without rounded corners or other curvatures, indentations, or protuberances). For an adult, the foot covering will typically be 12 to 14 inches (approximately 30 to 36 centimeters) long and 5 to 6 inches (approximately 13 to 15 centimeters) wide. Different sizes may be provided at the point of use. For example, at a security station at an airport, several rolls may be provided, each with a different size foot covering (e.g., large, medium, and small). Regardless of its length and width, the thickness of the foot covering will usually be no greater than 30 mils, often no greater than 20 mils, desirably no greater than 10 mils, more desirably no greater than 5 mils, most desirably no greater than 4 mils, preferably no greater than 3 mils, and more preferably no greater than 2 mils.

In summary, the present invention provides a foot covering that is inexpensive and easy to manufacture, can be made of low-cost materials, can be easily distributed to potential users (e.g., at airports), can easily and quickly be dispensed one at a time, can be made transparent (e.g., to facilitate security checks), protects the feet against dirt and pathogens, can be easily and rapidly put on and removed from the feet, can be made of recyclable materials, and is inexpensive enough to be used just once.

The invention has been described in an illustrative manner and the terminology that has been used is intended to be in the nature of description rather than of limitation. Modifications and variations that can be made should be apparent in light of the teachings herein. It is, therefore, to be understood that within the scope of the appended claims, the invention can be practiced otherwise than as specifically described and that the claims are intended to cover all modifications and variations falling within the true spirit and scope of the invention.

I claim:

1. A protective foot covering consisting of three thin transparent plastic sheet portions which form a foot protective covering which completely encloses the foot:
   a first portion being a bottom portion extending from a rear edge at a heel area to a front edge at a toe area;
   Second and third portions being a top toe portion and a top heel portion, the toe portion having a rear edge separated from a front edge of the heel portion to form a foot entrance, the foot entrance being located at least one millimeter from the rear edge to create a heel structure which extends onto the back of the wearer's foot;
   the second and third portions being superimposed on the bottom portion and the portions being joined to each other at the sides so that a concavity is formed between the top portions and bottom portion for receiving the foot of a person between the front and heel portion.

* * * * *